United States Patent [19]

Bookout

[11] 4,007,648
[45] Feb. 15, 1977

[54] FIVE-SPEED AUTOMATIC TRANSMISSION
[75] Inventor: Charles C. Bookout, Orchard Lake, Mich.
[73] Assignee: Ford Motor Company, Dearborn, Mich.
[22] Filed: Apr. 24, 1975
[21] Appl. No.: 571,025
[52] U.S. Cl. .................................. 74/763; 74/753; 74/766
[51] Int. Cl.² ......................................... F16H 57/10
[58] Field of Search ........ 74/758, 759, 753, 750 R, 74/752, 762, 763, 766, 770

[56] References Cited
UNITED STATES PATENTS

| 3,022,683 | 2/1962 | Simon | 74/759 |
| 3,106,107 | 10/1963 | Hardy | 74/758 X |
| 3,678,784 | 7/1972 | Lemieux | 74/759 |
| 3,820,418 | 6/1974 | Ott | 74/759 |
| 3,905,252 | 9/1975 | Zaiser | 74/759 |

Primary Examiner—Samuel Scott
Assistant Examiner—D. W. Keen
Attorney, Agent, or Firm—Donald J. Harrington; Keith L. Zerschling

[57] ABSTRACT

A planetary gear transmission having three planetary gear units, two of which are simple planetary gear units and one of which is a compound planetary gear unit for use in an automotive vehicle driveline to establish five driving speed ratios and a reverse speed ratio with relatively evenly spaced ratio steps and having a minimum number of friction clutch or brake members.

6 Claims, 3 Drawing Figures

5 Speed Automatic Transmission

Torque Ratios

Lo: $\dfrac{2\left(1+\dfrac{S_2}{R}\right)}{1-\dfrac{S}{R}} = 4.66$

2nd: $\dfrac{2}{1-\dfrac{S}{R}} = 3.33$

3rd: $\dfrac{1+\dfrac{S_2}{R}}{1-\dfrac{S}{R}} = 2.33$

4th: $1+\dfrac{S_2}{R} = 1.40$

Hi: $1.0$

Rev: $\dfrac{-R}{S}\left(1+\dfrac{S_2}{R}\right) = -3.5$

|  | $CL_1$ | $CL_2$ | $BR_1$ | $BR_2$ | $CL_3$ | $BR_3$ | $ORB_1$ | $ORB_2$ |
|---|---|---|---|---|---|---|---|---|
| Lo | X |  |  | HB |  | HB | X | X |
| 2nd | X |  |  | HB | X |  |  | X |
| 3rd | X |  | X |  |  | HB |  | X |
| 4th | X | X |  |  |  | HB |  | X |
| Hi | X | X |  |  | X |  |  |  |
| Rev |  | X |  | X |  | X |  |  |

FIVE-SPEED AUTOMATIC TRANSMISSION

GENERAL DESCRIPTION OF THE INVENTION

The transmission of my invention comprises first and second simple planetary gear units and a compound planetary gear unit, the latter being located intermediate the simple planetary gear units. The elements of the gear units are arranged in driving relationship, one with respect to the other, to provide substantially evenly spaced ratio steps. The highest speed ratio is a direct-drive ratio and the lowest speed ratio is sufficient to permit adequate wheel torque when the vehicle driveline includes a relatively small internal combustion engine.

I am aware of prior art transmissions employing planetary gearsets to provide four forward driving speed ratios. By using the teaching of my invention, I make it possible to obtain an additional fifth ratio without increasing the number of planetary gearsets and without increasing the total number of friction clutch or brake elements compared to prior art designs that employ four driving ratios. The torque input shaft for the planetary gear system is connected to the crankshaft through a torque coverter. Provision may be made for locking-up the converter with a lock-up clutch to establish a mechanical torque delivery path between the engine and the transmission if that is desired.

In a preferred embodiment of my invention it is possible to use common pitch diameters for the sun gears and the ring gears for the planetary gear units. It is possible also to use a common sun gear for the first gearset and the compound planetary gearset and to use a common ring gear for each of the three gearsets. This makes it possible to reduce the cost of manufacturing the gearing since the common elements of the gearsets may be formed in a single machining operation. The gear system itself also is simplified as is the assembly procedure for the transmission.

PARTICULAR DESCRIPTION OF THE INVENTION

Figures 1, 2, 3:
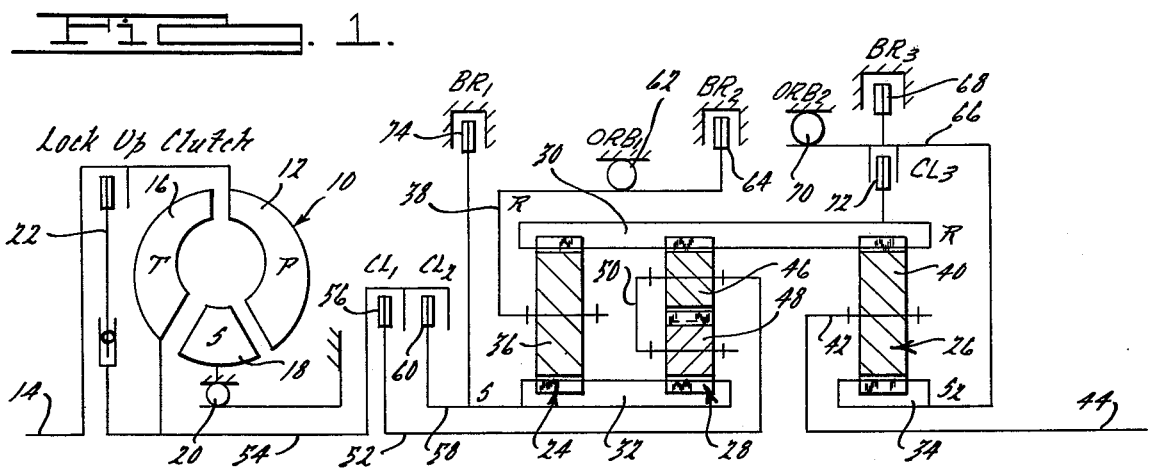
FIG. 1 is a schematic representation of a gear system embodying the improvements of my invention.
FIG. 2 is a chart illustrating typical transmission ratios for the gear system of FIG. 1.
FIG. 3 is a chart that illustrates the clutch and brake engagement-and-release pattern for establishing five forward driving ratios and a reverse ratio for the gear system of FIG. 1.

FIG. 1, numeral 10 designates a torque converter that includes an impeller 12 connected drivably to the engine crankshaft 14 for an automotive vehicle driveline. Turbine 16 is arranged in toroidal fluid-flow relationship with respect to the impeller 12. A bladed stator 18 is located between the flow exit section of the turbine 16 and the flow entrance section of the impeller 12. The stator 18 is anchored against rotation in one direction by over-running brake 20 during torque multiplication but rotation in the opposite direction is permitted during coupling operation. A lock-up clutch 22 may be used to connect mechanically the turbine and the impeller.

The gear system comprises a first simple planetary gear unit 24, a second planetary gear unit 26 and a third planetary gear unit, which is a compound unit as shown at 28. Gear units 24, 26 and 28 have a common ring gear 30 which may be machined by a single machining operation. The pitch diameters for each of the ring gears for the planetary gear units are equal. Gear units 24 and 28 have a common sun gear 32, which may be formed in a single machining operation since the pitch diameter for the sun gears of gear units 24 and 28 are the same.

Gear unit 26 has a sun gear 34. Preferably the pitch diameter of sun gear 34 equals the pitch diameter of sun gear 32, in which case it may be formed during the machining operation for sun gear 32.

Gear unit 24 includes a set of planetary pinions 36 journalled on carrier 38. Gear unit 26 includes pinions 40 journalled on carrier 42. Power output shaft 44 is connected drivably to the carrier 42. Gear unit 28 includes a pair of compound planetary pinions 46 and 48 which are journalled on a common carrier 50. Torque input shaft 52 is connected drivably to the carrier 50 and planet pinions 46 and 48 mesh with each other. The pinions 46 engage ring gear 30 and pinions 48 engage sun gear 32. Pinions 36 engage both the ring gear 30 and the sun gear 32, and pinions 40 engage ring gear 30 and sun gear 34.

Turbine shaft 54 for the torque converter 10 is adapted to be connected to the torque input shaft 52 through a selectively engageable friction clutch 56. Clutch 56 is engaged during operation in each of the five forward-driving ratios. Turbine shaft 54 is adapted to be connected to sun gear shaft 58 through a second selectively engageable friction clutch 60. This clutch is engaged during operation in the fourth forward driving ratio, in high direct-drive ratio and in reverse ratio. It is disengaged during operation in the first three underdrive ratios.

Carrier 38 is adapted to be braked or anchored against the stationary transmission housing through an overrunning brake 62. This coupling is engaged during operation in the first two underdrive ratios but it free-wheels at other times. In order to establish hill braking operation when the transmission is conditioned for operation in the two lowest forward driving ratios, a friction brake 64 is applied to the carrier 38.

The sun gear 34 is connected to brake member 66, which is adapted to be braked during operation in the low ratio and in the third and fourth drive ratios. To establish hill braking operation, if hill braking is needed, braking is accomplished by friction brake 68. During normal forward drive operation in these ratios, brake member 66 is anchored by overrunning brake 70.

During operation in the second underdrive ratio the gear unit 26 is locked up by friction clutch 72 for operation with a one-to-one ratio. This causes the ring gear 30 to travel in unison with the output shaft 44.

Clutch 72 and clutches 56 and 60 are applied simultaneously to establish direct-drive high speed operation. In this condition all of the gear units rotate in unison with one-to-one ratio.

Sun gear 32 is adapted to be anchored by friction brake 74 during operation in the third driving ratio. It is engaged simultaneously with clutch 56. Overrunning brake 70 provides torque reaction for the gear system.

If it is assumed that the sun gears 32 and 34 are the same size and the gear units have a common ring gear, the various ratios are computed according to the formulas for each ratio shown in FIG. 2. The values for the ratios also are indicated in FIG. 2. For purposes of computing these ratios it is assumed that the ratio of the sun gear pitch diameter to the ring gear pitch diameter is equal to 0.40. Also for purposes of indicating the ratios of gears, the diameter of ring gear 30 is designated in FIG. 2 by the reference character R, the diameter of the sun gear 32 is indicated in FIG. 2 by the symbol S, and the diameter of sun gear 34 is indicated in FIG. 2 by the symbol S2.

FIG. 3 illustrates the clutch and brake engagement-and-release pattern for each of the underdrive ratios as well as reverse ratios. For purposes of FIG. 3, the clutch and brakes of FIG. 2 have been indicated by the symbol $CL_1$, $CL_2$, $BR_1$, $BR_2$, $CL_3$, $BR_3$, $ORB_1$ and $ORB_2$, respectively, which identify the clutches and brakes 56, 60, 64, 68 and 74.

Having described a preferred embodiment of my invention, what I claim and desire to secure by U.S. Letters Patent is:

1. A multiple ratio power transmission mechanism for use in an automotive vehicle driveline for delivering torque from a driving shaft to a driven shaft comprising three planetary gear units, said gear units including first and and second planetary units and a compound planetary gear unit, each planetary gear unit having a ring gear, a sun gear, planetary pinions engaging the sun and the ring gears and a carrier for journalling the planetary pinions, the sun gears for the first simple planetary gear unit and the compound planetary gear unit being connected together, the ring gears for the planetary gear units being connected together, the carrier of the second planetary gear unit being connected to said driven shaft, the driving shaft being connected to the carrier of said compound planetary gear unit, first clutch means for establishing a torque delivery path to said torque input shaft during operation in each forward driving ratio, second clutch means for establishing a torque delivery path to the common sun gear for the first planetary gear unit and said compound gear unit during operation in the fourth and fifth forward driving ratios and during operation in reverse ratio, first brake means for anchoring the carrier of the first planetary gear unit during operation in the first two underdrive ratios, second brake means for anchoring the sun gear of the second simple planetary gear unit during operation in the first speed ratio and in the third and fourth speed ratios, and third brake means for anchoring the sun gears of said first simple planetary gear unit and said compound planetary gear unit during operation in the third drive ratio.

2. The combination set forth in claim 1 wherein the ring gears for said gear units are common, the diameter of the ring gear for each gear unit being the same as the diameters for the other ring gears.

3. The combination set forth in claim 2 wherein the sun gear for said first simple planetary gear unit has the same diameter as the sun gear for the second simple planetary gear unit, and wherein the sun gear of said first simple planetary unit and the sun gear of said compound planetary gear unit comprise a single gear element.

4. The combination set forth in claim 3 wherein said compound planetary gear unit is located intermediate said first and second planetary units.

5. The combination set forth in claim 2 wherein said compound planetary gear unit is located intermediate said first and second planetary units.

6. The combination set forth in claim 1 wherein said compound planetary gear unit is located intermediate said first and second planetary units.

* * * * *